March 30, 1926.
H. C. INNES
WATERPROOFING CONSTRUCTION
Filed June 14, 1920
1,578,663
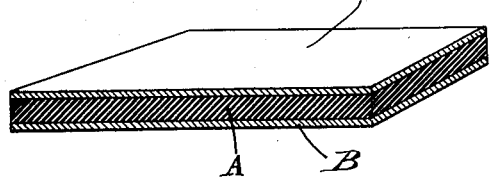
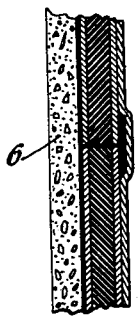
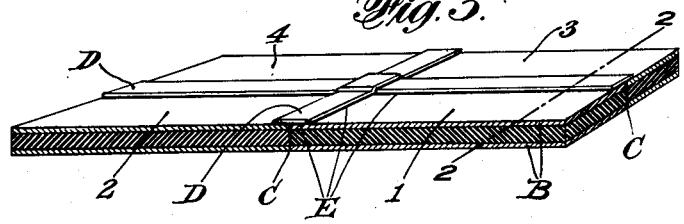
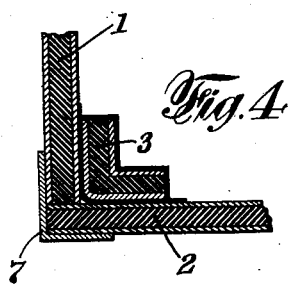
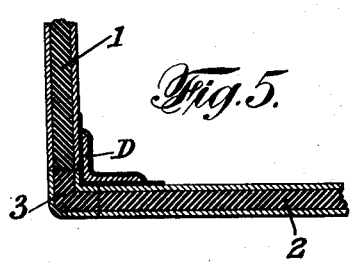
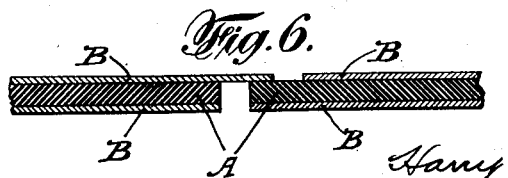
INVENTOR,
Harry C. Innes
BY
Kenyon & Kenyon
his ATTORNEYS Patented Mar. 30, 1926.

1,578,663

UNITED STATES PATENT OFFICE.

HARRY C. INNES, OF HARTWELL, OHIO, ASSIGNOR TO THE PHILIP CAREY MANUFACTURING COMPANY, A CORPORATION OF OHIO.

WATERPROOFING CONSTRUCTION.

Application filed June 14, 1920. Serial No. 388,946.

*To all whom it may concern:*

Be it known that I, HARRY C. INNES, a citizen of the United States, and a resident of Hartwell, in the county of Hamilton and State of Ohio, whose post-office address is 8360 Burns Avenue, Hartwell, Ohio, have invented new and useful Improvements in Waterproofing Construction, of which the following is a specification.

My invention relates to methods of waterproofing. It is especially adapted for use in waterproofing building structures, reservoirs, bridges, subways and other sub-level constructions, etc. Heretofore in the art of waterproofing such structures it has been the practice to apply separately to the surface to be waterproofed a number of plies of waterproofed paper or waterproofed felt, and bond them together by suitable bituminous waterproofing material, such as asphalt, coal tar, etc. In this way having determined the thickness of the waterproofing desired it was the practice to first apply an adhesive waterproofing coat to the surface to be waterproofed, then a ply or layer of felt or paper saturated with a waterproofing compound, then another layer or bond of waterproofing material, then another ply of waterproofed felt or waterproofed paper, and continue in this way the applications of the alternate layers of waterproofed felt or waterproofed paper and the bonding layer of waterproofing material until the desired thickness had been obtained. This has not been found to give entire satisfaction because the method of application permitted of many air spaces between layers and it was difficult to obtain a uniform application of the waterproof bond layer. It was an expensive operation, not only taking considerable time for application, but requiring the application of a number of plies of waterproofed felt or waterproofed paper to obtain the desired thickness. The paper or felt used in and of itself served no particular use in the waterproofing except as a carrier or binder to support the waterproofing material so as to obtain the desired thickness of the waterproofing material. My improved waterproofing material is manufactured to the desired thickness, size and shape at the factory in the form of boards or slabs, shipped to the point of application and then applied to the surface to be waterproofed. In this way the thickness of the waterproofing having been determined in advance, it is built in separate board like units and applied to the structure. It enables the waterproofing to be made in a board like unit form by machinery, preferably under pressure, so as to more thoroughly bring the supporting foundation or the layers of felt or paper used into more intimate association with the waterproofing material, thereby obviating the possibility of air pockets, obviating the possibility of the waterproofed paper or waterproofed felt not being completely coated with the waterproofing material and permits the waterproofing material proper to be used in any desired quantity and of any desired thickness, while at the same time providing a structure easily handled for transportation and conveniently and quickly applied to the surface to be waterproofed.

My method of application of my improved waterproofing facilitates the application, cheapening the cost and at the same time making a more thorough and complete waterproofing structure.

In the drawings, Fig. 1 is a perspective view of my waterproofing slab. Fig. 2 is a sectional view through line 2, 2 of Fig. 3, showing one method of application. Fig. 3 is a perspective view of my waterproofing slabs applied. Figs. 4 and 5 show method of application to a corner. Fig. 6 is a modification of my waterproofing slab. Fig. 1 shows a slab or board of my improved waterproofing material. The slab or board is formed preferably of a thick layer of asphalt A, which I have preferably combined with suitable filler of a character that permits of its being saturated by the asphalt. This asphalt compound is preferably tempered so that it will not crack at low temperatures or become too plastic at high temperatures. B, B, are layers of felt or paper, preferably saturated with an asphalt compound. Any suitable bituminous materials, coal tar or similar waterproofing materials could be used in making my improved waterproofing board or slab in place of the asphalt. The structure may be of any desired thickness, depending upon the requirements of its use to achieve the results desired. The thickness may be varied by making the layer of asphalt of any desired thickness and the layers of saturated felt or saturated paper of such thickness as may be found necessary to make a board like structure and of such number as desired. In practice I prefer, however, to have the layer of asphalt thicker than the layer of felt or if two layers of felt or more are used I prefer to have the asphalt or combined layers of asphalt, where more than two layers of felt are used, of thickness greater in cross section than the combined thickness of felt or paper. The asphalt or other waterproofing material used is the true waterproofing material; the felt or paper of itself does not serve as a waterproofing material, except in so far as it is saturated with a waterproofing compound. Figs. 2, 3, 4 and 5 show methods of application. In Fig. 2, 6 is a concrete surface; I preferably first apply a priming coat to this concrete surface, then an adhesive coat of suitable material depending upon the material of which the waterproofing slab has been manufactured, that is, if it is manufactured of asphalt I apply an asphalt paint or other suitable waterproof adhesive material, and if the slab or board is made of coal tar I prefer to apply creosote oil or similar material having an affinity for the coal tar so as to make a perfect adhesion. Having applied the adhesive I then apply the slabs of waterproofing sometimes direct to the adhesive coat and sometimes by also applying an adhesive coat on the exterior of the slab which is to contact with the adhesive coat on the concrete. It is not essential in all cases to apply the priming coat or the adhesive coat. If desired the slabs may be placed in position and other suitable means provided for holding them there. If the waterproofing is to be used between two surfaces where it would be held rigidly in place by the materials on each side of it the adhesive coat could be omitted if desired. Of course in many places it would not be necessary to use a priming coat. This is used primarily for concrete surfaces. The slabs 1, 2, 3 and 4 being laid in position as shown in Fig. 3, I then mop along the adjacent portions near the joint C forcing into the joint C asphalt or other bituminous material that I mop with, then apply a strip D of felt or paper saturated with a waterproofing material so as to overlap adjacent ends or sides of two or more of the slabs thereby covering the joints. When the joints have all been covered in this way I then mop over the entire surface with asphalt or other bituminous material and the waterproofing is finished. If there are any corners I waterproof them as shown in either Fig. 4 or 5. In Fig. 4 slab 1 rests upon or abuts against slab 2; first, however, I prefer to coat the top of slab 1 or the surface of slab 2 where they are to contact with an adhesive coat of waterproofing material. When they have been set in position I then take a section or slab or my waterproofing material, heat it and then bend it as shown in Fig. 4 wherein 3 is a slab bent at right angles. I then mop the corner surfaces of slabs 1 and 2 with a bituminous material, place slab 3 in position and then mop over the surface of slab 3 the edges tnereof and the surface of slabs 1 and 2 as shown with a waterproofing material and the corner is finished. If desired a piece of waterproof paper or felt 7 could be placed in the corner before the slabs 1 and 2 are placed in position and caused to adhere to slabs 1 and 2 by a coating of adhesive material. In Fig. 5, I have shown another method of waterproofing a corner wherein the slab 3 bent at right angles is placed in the corner, then the adjoining slabs 1 and 2 of the waterproofing is brought into contact with the slab 3. I then mop over the corner and the adjacent slabs with a bituminous material, apply a layer D of paper or felt saturated with waterproofing material, press it into the corner as shown so as to overlap the joints between slabs 1 and 3 and slabs 3 and 2 and then mop the entire surface with the bituminous material.

In the application of my waterproofing slabs I sometimes fill in joints between slabs by forcing in with a suitable instrument, such as a putty knife, a plastic mass of bituminous material or bituminous material combined with saturated felt, paper, etc. In Fig. 6 I have shown a slight modification of a waterproofing slab in which I show a portion of two waterproofing slabs cut to form a carpentering joint by having a portion of the saturated paper or felt of one slab overlapping a portion of the next adjacent slab. Any form of carpentering joint may be used in this way.

Wherever herein I have referred to the use of asphalt or asphalt compound, I would have it understood that any suitable bituminous or other waterproofing material could be used.

I claim:

1. A waterproofing construction consisting of a layer of preformed relatively rigid block like waterproofing slabs, composed of layers of bituminous saturated flexible sheets bonded together by a relatively thick layer of bituminous material and compressed into a block like slab, said slabs all arranged in the same plane with adjacent edges abutting so that corresponding sheets of flexible material in adjacent slabs will be in substantially the same plane and the corresponding layer of bituminous material in adjacent slabs will be in the same plane, a bituminous material between adjacent slabs cementing the abutting edges of adjacent slabs all so arranged that corresponding layers of flexible sheets in adjacent slabs are substantially continuous and the corresponding layers of bituminous material in adjacent slabs are substantially continuous.

2. A waterproofing construction consisting of a surface to be waterproofed having thereon a layer of preformed relatively rigid block like waterproofing slabs composed of layers of bituminous saturated flexible sheets bonded together by a relatively thick layer of bituminous material and compressed into a compact block like slab, said slabs all arranged in the same plane with adjacent edges abutting, so that corresponding sheets of flexible material in adjacent slabs are in substantially the same plane and the corresponding layer of bituminous material in adjacent slabs is in the same plane, means cementing abutting edges of adjacent slabs together all so arranged that corresponding layers of flexible sheets in adjacent slabs are substantially continuous and the corresponding layers of bituminous material in adjacent slabs are substantially continuous, a strip of waterproofed material covering the joint and cemented to and over a portion of the surface of adjacent slabs.

3. A waterproofing construction consisting of a layer of preformed relatively rigid block like waterproofing slabs, composed of a layer of bituminous saturated material bonded to a relatively thick layer of bituminous material and compressed into a block like slab, and slabs all arranged in the same plane with adjacent edges abutting so that corresponding layers of saturated material in adjacent slabs will be in substantially the same plane and the corresponding layer of bituminous material in adjacent slabs will be in the same plane, a bituminous material between adjacent slabs cementing the abutting edges of adjacent slabs all so arranged that corresponding layers of saturated material in adjacent slabs are substantially continuous and the corresponding layers of bituminous material in adjacent slabs are substantially continuous.

In testimony whereof, I have signed my name to this specification.

HARRY C. INNES.